(No Model.)
W. H. NEWTON.
CULTIVATOR.
No. 313,758. Patented Mar. 10, 1885.
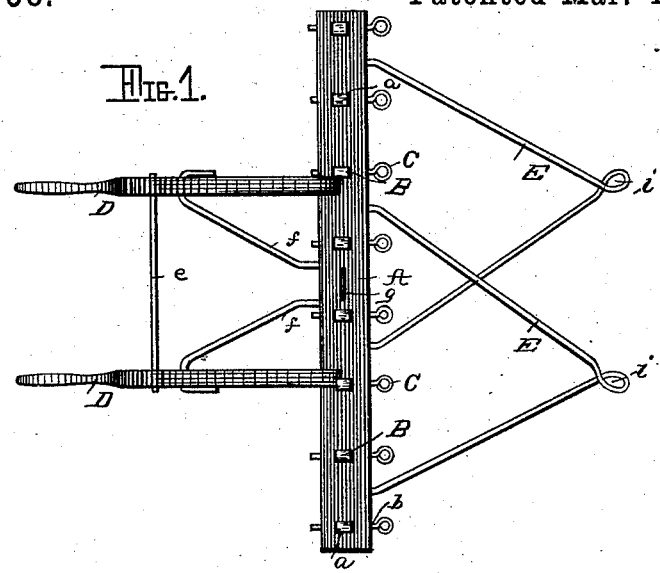
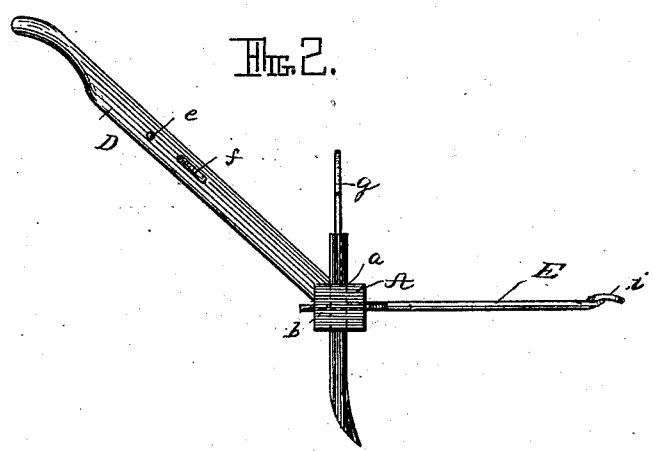
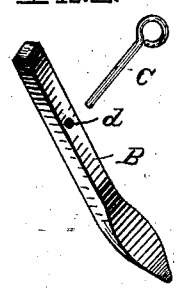
WITNESSES
INVENTOR
William H. Newton
By Myers & Co.
Attorneys

UNITED STATES PATENT OFFICE.

WILLIAM H. NEWTON, OF ASSUMPTION, ILLINOIS.

CULTIVATOR.

SPECIFICATION forming part of Letters Patent No. 313,758, dated March 10, 1885.

Application filed July 3, 1884. (No model.)

*To all whom it may concern:*

Be it known that I, WILLIAM H. NEWTON, a citizen of the United States of America, residing at Assumption, in the county of Christian and State of Illinois, have invented certain new and useful Improvements in Cultivators, of which the following is a specification, reference being had therein to the accompanying drawings.

This invention pertains to improvements in cultivators, having for its object to provide for the ready detachability of the tooth or shovel standards, and of the peculiar draft-connection with the standard-beam; and it consists of the construction and combination of parts, substantially as hereinafter fully set forth, and pointed out in the claims.

In the accompanying drawings, Figure 1 is a plan view of my improved cultivator. Fig. 2 is an end elevation, and Fig. 3 is a detailed perspective view of one of the shovel or tooth standards and its securing-pin.

In the organization of my invention I employ a single stout transverse beam, A, having a series of apertures, a, extending vertically through it, to receive, and within which are held, the cultivator shovel or tooth standards B, said beam also having a series of eye-bolt or pin receiving apertures, b, intersecting the standard-receiving apertures and passing through said beam. Said standards are each provided with a transverse aperture, d, extending through it, to receive an eyebolt or pin, C, passed through each aperture a of the beam A and readily removable to permit the ready attachment and detachment of said standards for renewal or shipment.

To the rear side of the beam A are connected at their lower ends the usually-disposed handles D, for guiding the cultivator, said handles being suitably connected together at near their upper ends by a cross bar or rod, e, and braced to the beam by the brace-rods f, with their lower ends secured in the rear side of the beam and their upper ends passed through the handles and bent or clamped against the outsides of the latter.

Secured in the upper side of the beam A at about its center is an eye-rod or support, g, which serves as a support and guide for the reins of the team.

E E are two approximately-triangular frames, with their base or divergent ends firmly secured to the front side of the beam A, the inner ends of the outer bars thereof being connected to the beam near its ends, while the inner bars of said frames cross each other about at their middles, thus bracing one another, said frames having eyes *i* at their outer ends, formed by looping their bars at their convergent ends, to which the whiffletrees or a draft-bar is connected for the application of the draft for the hitching of the team. This construction and disposition of frames effects the distribution of the draft throughout the entire plane of resistance of the whole row or series of teeth, or of the full working or cultivating capacity of the cultivator, whereby all side draft is avoided and each tooth or shovel caused to perform its complete working capacity.

Having thus fully described my invention, what I claim, and desire to secure by Letters Patent, is—

1. In a cultivator, the combination, with the standard-beam, of the draft attachment comprising the approximately-triangular frames E, with their outer bars connected at their inner ends to said beam near its ends, and their inner bars crossing each other about at the middle, and also connected to said beam, substantially as shown and described.

2. The cultivator comprising the single beam having intersecting series of apertures, the shovel or tooth standards having transverse apertures connected to said beam by the eyebolts or pins, the handles connected and braced to said beam, and the approximately-triangular draft-frames, with the divergent ends of their outer bars connected to said beam near its ends, and their inner bars crossing each other and also connected to said beam, substantially as shown and described.

In testimony whereof I affix my signature in presence of two witnesses.

WILLIAM H. NEWTON.

Witnesses:
 LEW. BAUM,
 JOHN W. HARPER.